United States Patent Office 2,877,802
Patented Mar. 17, 1959

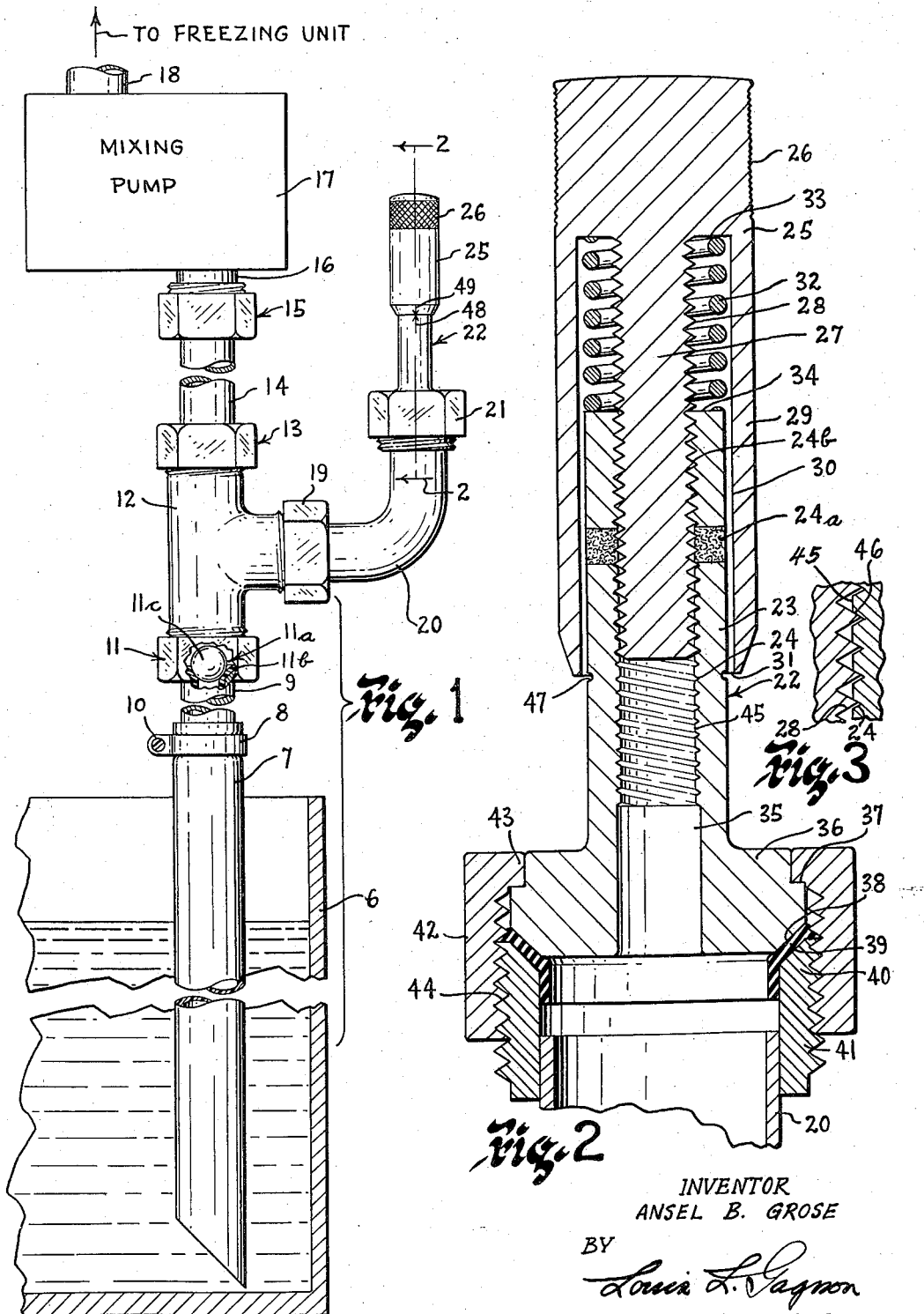

2,877,802

VARIABLE RESTRICTOR FOR GAS FLOW

Ansel B. Grose, Stoneham, Mass.

Application December 19, 1957, Serial No. 703,845

8 Claims. (Cl. 138—41)

This invention relates to improvements in means for producing a mixture of air and a liquid composition such, for example, as a composition which, when frozen, will produce fluffy ice cream, ice milk or sherbert, and has particular reference to the provision of a novel air metering device for use with said means.

The device embodying the invention is particularly adaptable for use in an ice cream dispensing system or the like of the type wherein the liquid mix of the ice cream is drawn by vacuum from a container into a mixing pump. The mixture is directed from the pump into a freezing unit from which the frozen mixture may then be drawn through a suitable manually operated tap line or the like. An air metering device is coupled with the liquid line so that air may be drawn by the vacuum through the metering device and mixed with the liquid simultaneous to its being pumped into the refrigerating unit.

Devices of this nature, in the past, employed so-called needle valves which proved unsatisfactory as they were not only difficult to adjust, but did not adequately control the flow of air into the air-liquid mixture. In many instances, following an idle period of the device and immediately upon starting the cycle of drawing the frozen cream during the usual course of dispensing, an excessive amount of air would be drawn into the mix with the result that this excessive air would cause an explosive effect whereby the frozen cream would splash over the wearing apparel of the operator as well as over the equipment.

It is believed that this disadvantage results from the fact that a needle valve initially permits an excessive amount of air to flow therethrough until a time interval is reached wherein the speed of travel of the air through the valve sets up sufficient friction to thereafter restrict the speed of flow in accordance with the adjustment of the needle valve.

The principal object of the present invention is to overcome the above difficulties, particularly the explosive splashes which previously occurred after an idle period of the dispensing device, through the provision of an air metering device which uniformly limits the flow of air therethrough and definitely avoids any surging of air into the mixture at the start of dispensing.

Another object is to provide an air metering device which is so constructed as to cause the air to be initially indirectly drawn into the device and thereafter be caused to travel in a relatively long spiral path whereby surging of excess air through said device is obviated and the speed of travel of the air may be positively controlled.

Another object is to provide a device of the above character with means for filtering and purifying the air prior to its entering into the metering device.

Another object is to provide a device of the above character which may be adjusted in a simple and efficient manner in combination with means for frictionally retaining said adjustment.

Another object is to provide means embodying a bore having a so-called shallow scratch thread formed internally thereof with relatively flat surface areas between said scratch threads in combination with a core of a controlled diameter having external threads of a controlled pitch adapted to be threadedly received in said bore and to provide a spiral passageway which may be increased or decreased by varying the length of the interfitting threaded portions.

Another object is to provide a metering device as set forth above which, in addition to the so-called shallow scratch threads which produce the spiral passageway, has fully interthreaded means which provide full depth lead threads and which function as protective means for preventing stripping of said scratch threads during the use of the device.

Another object is to provide a metering device of the above character with a sanitary cap encircling the interthreaded portions which form the spiral air passageway therethrough to cause said air to initially flow in a direction opposite to the direction of flow of the air through the spiral passageway and further having resilient means internally thereof for forcing adjacent side surfaces of the threaded portions into engagement with each other so as to limit the flow of air through said spiral passageway and to further aid in the preventing of dust, dirt, etc. from gaining access to the spiral passageway.

Another object is to provide means for determining the related adjusted positions of the portions which form the spiral passageway.

Another object is to provide a device of the above character wherein the flow of air may be controlled by increasing or decreasing the frictional path of travel of the air therethrough.

Other objects and advantages of the invention will become apparent from the following description taken in connection with the accompanying drawings wherein:

Fig. 1 is a side elevational view partially in section of the apparatus in which the device embodying the invention is incorporated;

Fig. 2 is an enlarged sectional view taken as on line 2—2 of Fig. 1 and looking in the direction indicated by the arrows; and Fig. 3 is a further enlarged fragmentary view of a portion of the device embodying the invention.

Referring more particularly to the drawings wherein like characters of reference designate like parts throughout the various views, one embodiment of the device as shown in Fig. 1 comprises a main supply tank 6 which in this instance contains a conventional liquid ice cream mixture prior to the freezing thereof. Extending within said ice cream mixture is a hose of flexible tubular material 7 secured by a metallic clamp ring 8 to the lower end of a pipeline 9 as by means of a clamp screw or the like 10. The pipeline 9 is secured by a sanitary coupling 11 to a T-joint 12. The coupling 11 has a pressure check valve 11a internally thereof. The said valve comprises a ball 11c which rests upon a resilient washer 11b. The T-joint 12 is, in turn, secured by a sanitary coupling 13 to a pipeline 14 which is also secured by a sanitary coupling 15 to a tubular lead 16 connected with a mixing pump 17. The coupling, internally thereof, is provided with a pressure valve similar to the ball valve 11a. The pump 17 is connected through the pipeline 18 to a conventional freezing unit.

The T-joint 12 is further secured by a sanitary coupling 19 to an elbow 20. The elbow 20 is secured by a sanitary coupling 21 to an air metering device 22. The air metering device 22 comprises a cylindrically shaped upright 23 which, as shown in Fig. 2 and as shown enlarged in Fig. 3, has in its bore a so-called scratch thread 24 extending to a location slightly above diametrically opposed openings 24a having suitable air filtering material therein and having upwardly thereof a fully threaded portion 24b. The scratch thread extends downwardly and terminates adjacent the top of a counterbore 35 formed in the lower end of said upright. A sanitary cap member 26 having a knurled area 25 is provided with a core 27 having an outer fully threaded portion 28 which is adapted to be threaded through the fully threaded portion 24b of the bore and within the scratch threads 24.

The cap member 25 is further provided with an outer integral cylindrical portion 29 which extends downwardly in overlapping relation with the upper end of the tubular upright 23 and which has an internal bore 30 of a diameter larger than the outside diameter of the tubular upright 23 so as to provide a space 31 therebetween. Internally of the outer integral cylindrical portion 29 there is provided a coil spring 32 which engages an annular shoulder 33 internally of the cap member 25 adjacent one end of said spring and which engages an annular end 34 formed on the upper end of the tubular upright 23.

The tubular upright 23 at its lower end is provided with an enlarged end 36 in the form of an annulus having an outwardly extending shouldered portion 37 and having its lower end surface 38 tapering inwardly. The inwardly tapering surface 38 is adapted to engage the angled portion 39 of a washer member formed of resilient material which, in turn, engages the angular seat 40 of an outwardly threaded coupling member 41. The coupling member 41 is connected to the end of the elbow 20 as by brazing or the like to form a sealed connection.

A nut 42 is provided with an inner annular flange portion 43 which is adapted to engage the shoulder 37 and is provided with an internal thread 44 threadedly connected with the outwardly threaded portion of the coupling 41. By suitably tightening the nut the member 36 may be forced into sealed relation with the resilient washer 39.

The assembly set forth above constitutes the general construction of the sanitary coupling 21 and of the various other sanitary couplings 11, 13, 15 and 19, respectively. The air metering device 22, in order to function properly, is initially preferably formed with a bore of a controlled diameter larger than the diameter of the core 27 as measured across the depth of the threads 28 and the threads 24 are preferably termed scratch threads as they extend inwardly of the walls of the bore only a slight amount as indicated in Figs. 2 and 3, while the threads 28 are of full pitch and are of a controlled amount per inch, in accordance with the size of spiral air passage desired intermediate said threads 28 and the inner flat ends 45 of the scratch threads 24.

The coil spring 32 is adapted to normally force the cap member 25 in an upward direction and, in turn, force the engaging surfaces 46 of the respective upper walls of the threads 28 and 24, respectively, into intimate engagement so as to form a substantially airtight seal throughout said engaging surfaces and further functions to frictionally retain the cap in adjusted position.

The length of thread bearing between the bore of the tubular upright 23 and the core 27 may be varied by threading the core inwardly and outwardly of the bore. However, the related diameter of the bore and the core 27, as set forth above, is so controlled in accordance with the function desired of said metering device so that when the said core is in a given threaded position, that is, having the suitable amount of threads extending inwardly of the bore that it establishes a zero position as indicated by an annular scored line 47 formed on the outer wall of the tubular upright 23 and further by longitudinally extending scored lines 48 and 49 formed on the outer surface of the tubular upright 23 and the cap 25, respectively.

The operation of the device is substantially as follows: When the mixing pump is started, the said pump creates a vacuum suction for lifting the liquid ice cream mix upwardly out of the container 6 through the hose line 7, T-joint 12, pipelines 14 and 16, and simultaneous to this function the vacuum draws air inwardly through the circumferential space 31 between the cylindrical portion 29 of the cap member and outer upper surface of the tubular upright 23. The air is thence drawn by the vacuum through the filters 24a in the openings in the side walls of the tubular upright and through the spiral air passageway formed between the threads 28 and the threads 24, respectively. The desired resistance to the drawing of the air through the spiral passageway is controlled by the diameter of said spiral passageway, the space between the flat ends 45 of the bore of the passageway, the pitch of the threads 28 and by the number of threads which extend inwardly of the bore in the tubular upright 23. This controls the related air to liquid ice cream mixture ratio prior to its being pumped into the freezing unit by the mixing pump and prior to its being manually drawn from the freezing unit in the conventional dispensing of the air-ice cream mixture. Therefore, the zero setting as established by the circularly scribed lines 47 and the respective lines 48 and 49, in accordance with the force of the vacuum, in the normal use of the device, provides the desired air to liquid mixture ratio. However, this may be varied by rotating the cap 25 to increase or decrease the length of the spiral passageway set forth above.

It has been found that desirable results are obtained in instances when the vacuum pull in drawing the mixture from the container 6 through the pipeline to the mixing pump is approximately 2" as measured by a standard vacuum gauge. The bore throughout the area having the scratch threads therein in this instance is of a diameter resulting from the use of an S-drill and the portion having the full threads 24b formed therein is initially drilled with a 5/16" drill to form a continuance of the bore and both bores are thereafter tapped with a 3/8-16 tap to simultaneously form the full threads 24b and the scratch threads 24. The core 27 is of a diameter of substantially 3/8" and is threaded to intimately fit the fully threaded portion 24a of the bore. The counterbore is preferably formed 7/16" in diameter but may be formed slightly larger if desired. With an approximately 2" vacuum pull the desired amount of air to be drawn into the mix through the air metering device is obtained by threading the core substantially five or six threads inwardly of the scratch threads directly below the vent openings having the filtering material 24a therein.

This provides what is known as the zero setting of the device as established by the circumferentially scribed line 47 and by the indexing lines 48 and 49, respectively.

It is to be understood, however, that the related proportion of the parts as set forth above may be varied in accordance with the pull of the vacuum.

While the metering device has been described above as adapted particularly for use in ice cream, ice milk or sherbert dispensing devices, it is to be understood that it may be used with any vacuum operated device and that various modifications of said device may be made without departing from the spirit of the invention as expressed in the appending claims as the arrangement set forth herein is only by way of illustration.

Having described my invention, I claim:

1. A device of the character described comprising a cylindrically shaped tubular upright having a longitudinal bore and a normally disposed air passageway communicating with said bore at a location spaced from the upper end of said upright, said bore above the normally disposed air passageway being of a controlled diameter having a continuous full thread and below said air passageway being of a diameter slightly larger than said controlled diameter and having a scratch thread with relatively flat surface areas intermediate said scratch threads and a core member having a continuous outer uniform full thread extending throughout the length thereof with a portion of said full thread extending through said fully threaded portion of said bore and into interconnected relation with the scratch threads beneath said air passageway, said core having a closed end cap member having a cylindrical inner wall and a closed end secured to the upper end of said core with a portion of said wall extending downwardly and overlying the normally disposed air passageway in spaced relation with the side wall of the tubular upright and having a lower open end and a spring member internally of said cap member in surrounding relation with the core and having one end thereof engaging the upper end of the tubular upright and its opposed end engaging an inner annular surface internally of the closed end of said cap member.

2. A device of the character described comprising a cylindrically shaped tubular upright having a longitudinal bore and normally disposed air passageways communicating with said bore at a location spaced from the upper end of said upright, said bore above the normally disposed air passageways being of a controlled diameter having a continuous full thread and below said air passageways being of a diameter slightly larger than said controlled diameter and having a scratch thread with relatively flat surface areas intermediate said scratch threads and a counterbore in the lower end of said bore communicating with said scratch threads, a core member having a continuous outer full thread extending inwardly and in intimate relation with said full threaded portion of said bore and further extending inwardly into interconnected relation with the scratch threads beneath said air passageways, said core having a cap member having an inner cylindrical wall and a closed end secured to the upper end of said core with a portion thereof extending downwardly in spaced relation with the tubular upright and in overlying relation with the normally disposed air passageways and a spring member internally of said cap member in surrounding relation with the core and having one end thereof engaging the upper end of the tubular upright and its opposed end engaging an inner surface of the closed end of said cap member.

3. A device of the character described comprising a cylindrically shaped tubular upright having a longitudinal bore and a normally disposed air passageway communicating with said bore at a location spaced from the upper end of said upright and having an opposed enlarged annular base, said bore above the normally disposed air passageway being of a controlled diameter having a continuous fully threaded portion and below and communicating with said air passageway being of a diameter slightly larger than said controlled diameter and having a scratch thread with relatively flat surface areas intermediate said scratch threads and a solid core member having a continuous outer full thread extending inwardly of said fully threaded portion of said bore and having a selected number of threads in interconnected relation with the scratch threads beneath said air passageway, said core having a cap member secured to the upper end thereof, said cap member having an inner cylindrical wall with a portion thereof extending downwardly in spaced relation with said tubular upright and overlying the normally disposed air passageway and a spring member internally of said cap member in surrounding relation with the core and having one end thereof engaging the upper end of the tubular upright and its opposed end engaging an inner annular surface internally of said cap member.

4. A device of the character described comprising a cylindrically shaped tubular upright having a longitudinal bore and a normally disposed air passageway communicating with said bore at a location spaced from the upper end of said upright, said bore above the normally disposed air passageway being of a controlled diameter having a continuous full thread and below said air passageway being of a slightly larger diameter having a scratch thread with relatively flat surface areas intermediate said scratch threads, an air filter located to filter the air passing through said passageway, and a core member having an outer continuous full thread with a portion thereof extending inwardly through said fully threaded portion of said bore and into interconnected relation with the scratch threads beneath said air passageway, said core having a cap member secured to the upper end thereof with a portion thereof having a cylindrical inner wall extending downwardly and overlying the normally disposed air passageway and a spring member internally of said cap member in surrounding relation with the core and having one end thereof engaging the upper end of the tubular upright and its opposed end engaging an inner annular surface internally of said cap member.

5. A device of the character described for use in connected relation with a vacuum lift arrangement, said device comprising a cylindrically shaped tubular upright having a longitudinal bore and normally disposed air passageway communicating with said bore at a location spaced from the upper end of said upright, said bore above the normally disposed air passageway having a continuous full thread and a scratch thread communicating with and extending below said air passageway having relatively flat surface areas intermediate said scratch threads and a core member having a continuous outer full uniform thread throughout the length thereof extending inwardly through said fully threaded portion of said bore and in intimate relation therewith and having a controlled amount of threads in interconnected relation with the scratch threads beneath said air passageway, said controlled amount of threads establishing a zero setting of said device, said core having a cap member with an inner cylindrical wall secured to the upper end thereof with a portion thereof extending downwardly and in spaced overlying relation with the normally disposed air passageway and the side wall of the cylindrically shaped tubular upright and a spring member internally of said cap member in surrounding relation with the core and having one end thereof engaging the upper end of the tubular upright and its opposed end engaging an inner annular surface internally of said cap member.

6. A device of the character described comprising a cylindrically shaped tubular upright having a longitudinal bore and normally disposed air passageways communicating with said bore at a location spaced from the upper end of said upright, said bore above the normally disposed air passageways being of a controlled diameter having a continuous fully threaded portion and below said air passageway being of a larger diameter and having a scratch thread communicating with said air passageways, said scratch threads having relatively flat surface areas therebetween and a counterbore in the lower end of said bore communicating with said scratch threads, a core member of uniform diameter having an outer full thread extending inwardly of and in intimate relation with said fully threaded portion of said bore and into interconnected relation with the scratch threads beneath said air passageway, said core having a cap secured to the upper end thereof, said cap having an inner cylindrically shaped wall with a portion thereof extending downwardly in spaced relation with the tubular upright and in overlying relation with the normally disposed air passageways, air filter means in said air passageways, and a spring member internally of said cap in surrounding relation with said core and having one end thereof engaging the upper end of the tubular upright and its opposed end engaging an inner annular surface internally of said cap member.

7. A device of the character described for use with a vacuum lift line, said device comprising a cylindrically shaped tubular upright having a longitudinal bore communicating with said lift line and a normally disposed air passageway communicating with said bore at a location spaced from the upper end of said upright and having an opposed enlarged annular base, said bore above the normally disposed air passageway being of a controlled diameter having a continuous fully threaded portion and below said air passageway being of a larger diameter having a scratch thread with relatively flat surface areas intermediate said scratch threads and a solid core member of the same diameter as the controlled diameter of the bore having an outer full thread extending inwardly of said fully threaded portion of said bore in intimate relation therewith and having a selected number of threads in interconnected relation with the scratch threads beneath said air passageway and designating a zero setting of said device, said core having a cap secured to the upper end thereof having an inner cylindrically shaped wall with a portion thereof extending downwardly in spaced relation with said tubular upright and overlying the normally disposed air passageway, air filtering means overlying said passageway, and a spring member internally of said cap in surrounding relation with the core and having one end thereof engaging the upper end of the tubular upright and its opposed end engaging an inner annular surface internally of said cap member.

8. A device of the character described for use with a vacuum lift line, said device comprising a cylindrically shaped tubular upright having a longitudinal bore communicating with said lift line and a normally disposed air passageway communicating with said bore at a location spaced from the upper end of said upright, said bore above the normally disposed air passageway being of a controlled diameter having a continuous full thread and below said air passageway being of a larger diameter having a scratch thread with relatively flat surface areas intermediate said scratch threads, said scratch threads being such as to form a spiral air passageway, an air filter located to filter the air passing through said passageway, and a core member of a diameter the same as said controlled diameter having an outer full thread extending inwardly of said fully threaded portion of said bore and into interconnected relation with the scratch threads beneath said air passageway, said core having a cap member secured to its upper end, said cap member having an inner cylindrically shaped wall with a portion thereof extending downwardly in spaced relation with the tubular upright and overlying the normally disposed air passageway, said cap member having an open lower end and a spring member internally of said cap member in surrounding relation with the core and having one end thereof engaging the upper end of the tubular upright and its opposed end engaging an inner annular surface internally of said cap member.

References Cited in the file of this patent
UNITED STATES PATENTS

| | | |
|---|---|---|
| 1,957,828 | Greenwald | Oct. 20, 1930 |
| 2,402,729 | Buchanan | June 25, 1946 |
| 2,517,154 | Wolf | Aug. 1, 1950 |
| 2,532,019 | Goldberg | Nov. 28, 1950 |
| 2,590,217 | Snyder et al. | Mar. 25, 1952 |